(12) United States Patent
Bodet et al.

(10) Patent No.: US 9,498,902 B2
(45) Date of Patent: Nov. 22, 2016

(54) PRESS FOR MANUFACTURING A ONE-PIECE OBJECT AND METHOD FOR USING SAID PRESS

(75) Inventors: Hervé Bodet, Verdun (FR); Dominique Fournet, Belleville sur Meuse (FR)

(73) Assignee: LINDAL FRANCE SAS, Briey (FR)

( * ) Notice: Subject to any disclaimer, the term of this patent is extended or adjusted under 35 U.S.C. 154(b) by 598 days.

(21) Appl. No.: 14/002,265

(22) PCT Filed: Mar. 2, 2012

(86) PCT No.: PCT/EP2012/053626
§ 371 (c)(1),
(2), (4) Date: Sep. 5, 2013

(87) PCT Pub. No.: WO2012/117092
PCT Pub. Date: Sep. 7, 2012

(65) Prior Publication Data
US 2013/0334733 A1     Dec. 19, 2013

(30) Foreign Application Priority Data
Mar. 3, 2011   (FR) ..................................... 11 51733

(51) Int. Cl.
*B29C 43/04*     (2006.01)
*B29C 45/00*     (2006.01)
(Continued)

(52) U.S. Cl.
CPC ........... *B29C 43/04* (2013.01); *B29C 45/0062* (2013.01); *B29C 45/06* (2013.01); *B29C 45/14467* (2013.01); *B65D 47/0885* (2013.01);
(Continued)

(58) Field of Classification Search
CPC ................................................ B29C 45/0062

USPC ........................................... 425/515; 264/251
See application file for complete search history.

(56) References Cited

U.S. PATENT DOCUMENTS

2003/0178744 A1   9/2003   Schneider
2005/0095311 A1   5/2005   Nishizawa et al.

FOREIGN PATENT DOCUMENTS

FR        2731983 A1    9/1996
JP        01-110918 A   4/1989
(Continued)

OTHER PUBLICATIONS

International Search Report for PCT/EP2012/053626, Mailing Date of May 14, 2012.

*Primary Examiner* — Alison L Hindenlang
*Assistant Examiner* — Kimberly A Stewart
(74) *Attorney, Agent, or Firm* — Westerman, Hattori, Daniels & Adrian, LLP (57) ABSTRACT

A press for manufacturing a one-piece object includes two rotary plates (110, 210) which are parallel but offset, each carrying a mold (120, 220) having two portions. Each mold portion can be placed above or below, so that the mold portion (121) of the first mold situated above faces the mold portion (222) of the second mold situated below. First parts of the object, for example skirts, are inserted in the press in an insertion zone (Z1). In parallel, second parts, for example caps, are introduced into an introduction zone (Z2). In a common zone (Z3), third parts, for example dispensing heads, are overmolded on the first and second parts brought close in the common zone in the same position as in the finished object. After opening the press, the plates are turned so that the finished objects are in the portion of the second mold which is above.

18 Claims, 3 Drawing Sheets

(51) Int. Cl.
*B29C 45/06* (2006.01)
*B29C 45/14* (2006.01)
*B65D 47/08* (2006.01)
*B29C 45/16* (2006.01)
*B29L 23/20* (2006.01)

(52) U.S. Cl.
CPC ........ *B29C 45/1671* (2013.01); *B29L 2023/20* (2013.01)

(56) References Cited

FOREIGN PATENT DOCUMENTS

| | | | | |
|---|---|---|---|---|
| JP | H01-110918 A | * | 4/1989 | ............. B29C 33/44 |
| JP | 2010-0179511 A | | 8/2010 | |
| JP | 2010-179511 A | * | 8/2010 | ............. B29C 45/06 |
| WO | 01/78958 A1 | | 10/2001 | |

* cited by examiner

PRESS FOR MANUFACTURING A ONE-PIECE OBJECT AND METHOD FOR USING SAID PRESS

The invention relates to a press for overmolding a part on a first part and a second part so as to obtain an object in one piece. The invention also relates to a method for overmolding a part on a first part and a second part to obtain an object in one piece using the press of the invention.

From document FR 2731983 A1, a method is known for integrally molding a tube consisting of a skirt, a dispensing head and a hinged cap. To this effect, a mold consisting of a base, two molding drawers, a molding core and an outer molding body are used. The base is equipped with a molding surface having a shape complementary to that of the inner face of the hinged cap and of the outer face of the top wall of the dispensing head. The drawers are placed below the base, on either side of the space in which the dispensing head will be formed. The first drawer has a molding surface having a shape complementary to that of the outer face of the hinged cap and a molding surface having a shape complementary to one half of the perimeter of the dispensing head. The second drawer has a molding surface having a shape complementary to the other half of the dispensing head. Below the drawers is located the molding body which has a cavity having a shape complementary to the skirt. In the center of the molding body is located the molding core which has in its upper part a molding surface having a shape complementary to the inner face of the dispensing head. The molding core defines with the molding body and the drawers a first free space which communicates with a second free space formed between the first drawer and the base. To unmold a tube manufactured in this mold by injection, it is necessary to raise the base, separate the hinged cap from its molding surface formed in the first drawer and fold it onto the dispensing head and separate the two drawers. The molding core is then released along with the tube and the tube is ejected from the core. This method does not allow the production of very complex parts. In addition, this method allows the injection of only a single material. In other words, the tube is made of a single material and has a single color.

From WO 01/78958 A1, a method is known that uses sluices to allow molding of a hinged cap on a dispensing head by choosing materials that are the same but with different colors, or materials that are different but compatible. This process allows overmolding of only one part over another.

A method commonly used in the tube manufacturing industry includes, first, extruding and cutting skirts to the desired length in a first tool. The skirts are then strung on molding cores placed in molding bodies made by groups on a rotary plate. The plate is then rotated until the skirts are located under an injection tool. A movable mold with as many molding surfaces as there are skirts is closed over the rotary plate. To each molding core corresponds a molding surface in the movable mold. A space is formed between the molding core and the corresponding molding surface, whose volume corresponds to the dispensing head to be overmolded on the skirt. After injection of the material forming the dispensing head, the tool is opened and the movable mold is raised. The rotary plate is rotated again leaving the tubes to cool before reaching a position in which these tubes consisting of the skirt and the overmolded head are ejected from the mold carrying the molding cores. In practice, the rotary plate has several identical angular sectors each having an identical set of molding bodies and molding cores. This allows a semi-continuous manufacture of the tubes. If, for example, the tray has eight sectors, it rotates an eighth of a turn at every step. While the skirts are strung over the molding cores of the first sector, the tool is closed on the second sector, the third is under the injection tool, the fourth and fifth are in stabilization and cooling phases, the sixth in the tube ejection phase. The seventh sector is subjected to a positioning control and the eighth sector is in the standby position. Once the first sector is filled with skirts and the injection in the third sector is completed, the rotary plate is rotated an eighth of a turn and the procedure continues according to its cycle. After ejection from the injection workstation, the tubes provided with dispensing heads are then brought to another injection workstation where caps are overmolded. It is also possible, in that other workstation, to screw of fix by other means caps manufactured in still another workstation.

In all cases, several workstations are required, which must be connected by conveyors, causing the installations to be both expensive and bulky.

From document JP 2010 179511 A, a press is known for the manufacture of hollow objects such as light bulbs consisting of a base, a cover serving as a lens and a lighting element. The press is provided with a fixed portion and a movable portion. The fixed portion and the movable portion are each provided with a rotary plate and a stationary plate positioned adjacent to it. The rotary plates are placed one facing each other so that they partly overlap. The first fixed plate is placed facing the second rotary plate, in the zone not covered by the first rotary plate. Similarly, the second fixed plate is placed facing the first rotary plate in the zone not covered by the second rotary plate. Each rotary plate has at least two identical molding surfaces placed symmetrically relative to the axis of rotation of the plate in question. Each fixed plate carries a molding surface complementary to those of the rotary plate it faces. This press allows to mold the base between the first fixed plate and the second rotary plate and the cover between the second fixed plate and the first rotary plate. After rotation of the two rotary plates and insertion of a diode into the base, the base and the cover are located in the portion where the two rotary plates are superposed so that the two parts are aligned and secured together. This press does not allow overmolding a third part between a first part and a second part which are not aligned.

The aim of the invention is to provide a press and a method for manufacturing at low cost objects in one piece consisting of a first part and a second part manufactured separately and joined together by an overmolded part. This press and this method need to be suitable in particular for the manufacture of tubes formed in one piece from skirts and hinged caps manufactured separately and a dispensing head overmolded on these first two parts. To this effect, the production line needs to be simplified and made more compact.

This aim is achieved according to the invention in that the press has the following additional elements:
  a first frame provided with a first rotary plate pivotable about a first axis of rotation and on which is fixed a first mold having at least two portions, on each of which is placed a molding surface having a shape complementary to that of one of the faces of the part to be overmolded and a support for the second object, the molding surface and the support of the first portion being arranged according to a same symmetry with respect to the first axis of rotation as the molding surface and the support of the second portion,
  a second frame provided with a second rotary plate pivotable about a second axis of rotation and on which is fixed a second mold having at least two portions, on each of which is placed a support for receiving the first part, the support of the first portion being arranged according to a same symmetry with respect to the second axis of rotation as the support of the second portion;

means being provided to move the two frames away from each other and toward each other in a translational movement parallel to the first axis of rotation of the first plate;

the first and second plate being parallel to each other;

the first and second axes of rotation being parallel to each other and staggered in such a way that in the closed position of the press one of the two portions of the first mold is aligned and in contact with one of the portions of the second mold in a zone called common zone, while the other portion of the first mold is not in contact with the second mold and is in an introduction zone and the other portion of the second mold is not in contact with the first mold and is in an insertion zone;

rotation means being provided to bring the first and second portions of the first mold into the common zone or into the introduction zone and to bring the first and second portions of the second mold into the common zone or into the insertion zone;

the molding surfaces and the supports of the first mold and the supports of the second mold being positioned on their respective molds so as to create, when their mold portions are in contact in the common zone and a first part and a second part are in place on their respective supports, a space having a shape complementary to that of the part to be overmolded;

injection means being adapted to inject the material of the object to be overmolded into the common zone.

Such a press allows overmolding, in a single step, onto two objects placed in two different molds positioned facing each other, a third object which will act as a link between them. Thanks to the two rotary plates and the two mold portions, it is possible to load the first and second parts in introduction and insertion zones while a load for parts to be overmolded is injected into the common zone. Once this step is completed, it is sufficient to rotate the plates to reverse the first and second mold portions and restart the production cycle.

For its use, the following method is provided:
a) Insertion of first parts into the supports of the portion of the second mold which is located in the insertion zone and introduction of second parts in the supports of the portion of the first mold which is located in the introduction zone;
b) Opening of the press if it is not already open and rotation of the two plates so that the portion of the first mold which was in the introduction zone and the portion of the second mold which was in the insertion zone are located in the common zone;
c) Closing of the press;
d) Insertion of first parts in the supports of the portion of the second mold which is located in the insertion zone and introduction of second parts in the supports of the portion of the first mold which is located in the introduction zone. In parallel, overmolding of the overmolded parts onto the first and second parts which are located in the common zone;
e) Opening of the press in such a way that the objects obtained after overmolding of the overmolded part onto the two other parts are located on the supports of the portion of the second mold which is located in the common zone;
f) Rotation of the two plates so that the portion of the first mold which was in the introduction zone and the portion of the second mold which was in the insertion zone are in the common zone;
g) Closing of the press;
h) Extraction of the finished objects which are located on the supports of the portion of the second mold located in the insertion zone and insertion of new first parts on the supports thus freed, introduction of new second parts on the supports of the portion of the first mold which is located in the introduction zone. In parallel, overmolding of the overmolded parts onto the first and second parts which are located in the common zone;
i) Continuation of the cycle as in step e).

In order to allow overmolding of a third part onto two first parts so that the overmolded part extends beyond the molding surfaces for the two other parts, it is preferable to associate, to each support of the second mold, a molding surface, placed on said second mold, having a shape complementary to that of one of the faces of the second part, the molding surfaces of the second mold and the supports of the first mold being placed in their respective molds in such a way that they are aligned when their mold portions are in contact in the common zone. In this case, the method provides for introducing a portion of the free face of the second parts into the second molding surfaces of the second mold during steps c and g, that is to say, during closing of the press. The term free face means the face of the second object that is not in contact with the support of the first mold.

To introduce the second part into the first mold, a device is provided on the second frame, facing the portion of the first mold which is located in the introduction zone.

In an alternative embodiment of the invention, the device for introducing the second object into the first mold is constituted by a third mold, parallel to the second mold, this third mold having a molding surface for one of the faces of the second object, and m-that-the supports of the first mold are formed by molding surfaces for another face of the second object, injection means being provided for injecting the material of the second object into the space formed, when the press is closed, by the molding surface of the third mold and the molding surface of the first mold located in the portion of the first mold located in the introduction zone In this case, the third mold preferably includes, in addition to the molding surface for the second part, a molding surface inverted with respect to that of the molding surfaces of the first mold.

In this embodiment, it is provided that—step a is preceded by the closing of the press, —in steps a, d and h, the introduction of second parts into the supports of the portion of the first mold which is located in the introduction zone is performed by injection into the space formed between the molding surfaces of the third mold and the molding surfaces of the portion of the first mold which is in the introduction zone, and-m-that—in steps b and e, the opening of the press is performed in such a way that the second parts obtained after injection into the introduction zone are located on the molding surfaces of the portion of the first mold which is located in the introduction zone.

The press of the invention is particularly suitable for manufacturing a tube constituted by a skirt forming the first part, a hinged cap forming the second part, and a dispensing head forming the part to be overmolded, in that the supports of the second mold are constituted by a core, the top face of which corresponds to at least a portion of the inner face of the dispensing head to be overmolded, the transverse cross section of the core corresponding to the inner transverse cross section of the skirt, the molding surfaces of the first mold corresponding to the outer face of the dispensing head to be overmolded and the supports corresponding to the inner face of the hinged cap, the molding surfaces of the third mold corresponding to the outer face of the hinged cap.

To allow the simultaneous overmolding of several parts to be overmolded, preferably, each portion of the first mold and of the second mold and the third mold have several sets of supports and/or molding surfaces.

To allow the inclusion of the inserts into the overmolded parts or to provide an additional treatment on the overmolded part, it can be useful if the first and/or second mold include, in addition to their first and second portions, other extra portions, each having the same number of molding surfaces and/or supports as the corresponding first and second portions, these molding surfaces and/or supports being arranged on these additional portions according to the same symmetry with respect to the axis of rotation of the corresponding plate as the molding surfaces and/or supports of the corresponding first and second portions.

When the second mold includes a third portion, it is provided in the method that the rotation of the second plate in steps b and f is performed in such a way that the first portion of the second mold takes the place of the second, the second portion takes the place of the third, and the third portion takes the place of the first, so that one of the portions is in the insertion zone, another is in the common zone and the third is located in an intermediate zone which can be located chronologically between the insertion zone and the common zone or between the common zone and the insertion zone. In this case, in the intermediate zone, inserts are placed in the supports in order to drown them in the mass of the part to be overmolded, or lids are welded on openings provided in the parts to be overmolded.

When the second mold has a third portion and a fourth portion, the rotation of the second plate in steps b and f is performed in such a way that the first portion of the second mold takes the place of the second, the second portion takes the place of the third, the third portion takes the place of the fourth and the fourth portion takes the place of the first, so that one of the portions is in the insertion zone, another is in the common zone and the third and fourth are in two intermediate zones which can be located chronologically between the insertion zone and the common zone and/or between the common zone and the insertion zone. In this case, in the first intermediate zone, inserts are placed in the supports in order to drown them in the mass of the part to be overmolded, and in the second intermediate zone, lids are welded on openings provided in the parts to be overmolded.

The invention is described in more detail below using an exemplary embodiment. The figures show:

FIG. 1: a) a perspective view of a tube made according to the method, b) a cross-sectional view of the cap and the dispensing head of the tube, c) and d) exploded views of the cap and the head;

By convention, the press is shown and described with vertical plates (110, 220). However, it is also possible to place them horizontally.

The press shown in the exemplary embodiment allows the manufacture of a tube (300) in one piece. This tube is constituted by a skirt (310), a dispensing head (320) and a hinged cap (330). The skirts (310) are obtained previously in a traditional way by extrusion, or in the form of welded laminated films, and they are cut to the desired dimensions. The process that will be described in more detail below can be summarized as follows: the skirts (310) are inserted into the press in a first zone, called insertion zone (Z1). In parallel, the hinged caps (330) are injected into a second zone of the press, called cap injection zone (Z2). In a third zone, called common zone (Z3), the hinged caps (330) are placed adjacent to the skirts (310), in the positions they will have in the finished objects before unmolding, and the dispensing heads (320) are overmolded onto the skirts (310) and hinged caps (330) so as to obtain a tube in one piece. After stabilization and partial cooling, the press is opened and the tubes (300) are ejected from the mold, while the caps (330) can be folded over the dispensing heads either before or after ejection of the tubes.

The press comprises a fixed portion (100) and a movable portion (200).

The fixed portion (100) is constituted by a fixed frame (101) on which is mounted a first rotary plate (110) pivotable about a first axis of rotation (111) perpendicular to the plate. A first mold (120) is fixed to the first plate (110). This first mold (120) is divided into two portions (121, 122) symmetrical with respect to the first axis of rotation (111). Each portion (121, 122) has four molding surfaces arranged in a square. Each molding surface is constituted by, on the one hand, a matrix (123) having a molding shape complementary to that of the outer face (321) of the dispensing head (320), and on the other hand, a core (124) having a molding shape complementary to that of the inner face (332) of the hinged cap (330). The molding surfaces are oriented in such a way that the cores (124) having shapes complementary to those of the caps are arranged in the center of the square while the matrices (123) having shapes complementary to the shapes of the dispensing heads are arranged on the edges of the square. Rotation means are provided for rotating the first rotary plate (110) between two opposite positions: in the first, the first portion (121) of the first mold is located at the top, above the first axis of rotation (111), and the second (122) is at the bottom, below the first axis of rotation. This is the situation shown in FIG. 4. In the second position, the two portions (121, 122) are rotated by 180° and are thus reversed.

Figure 1A:
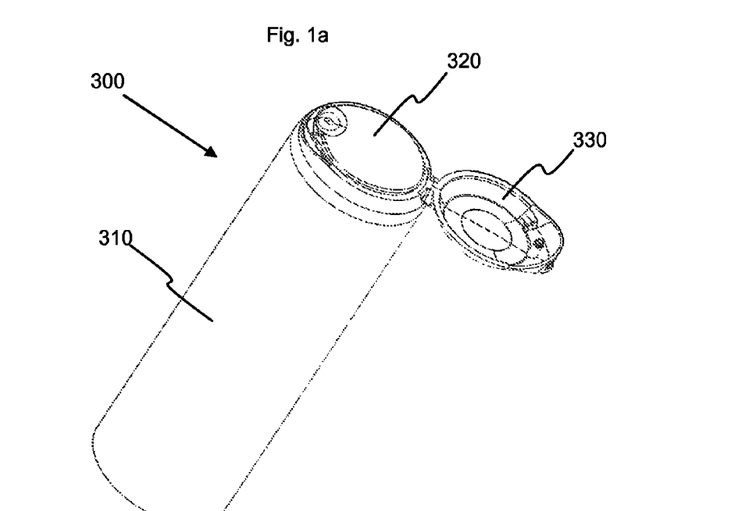
Figure 1B:
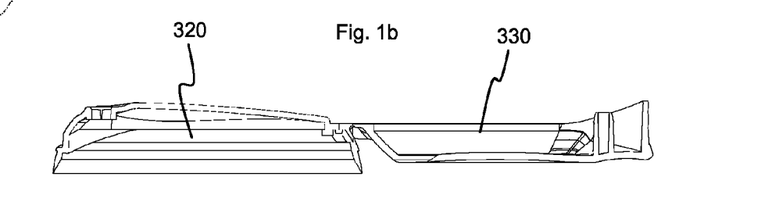
Figure 1C:
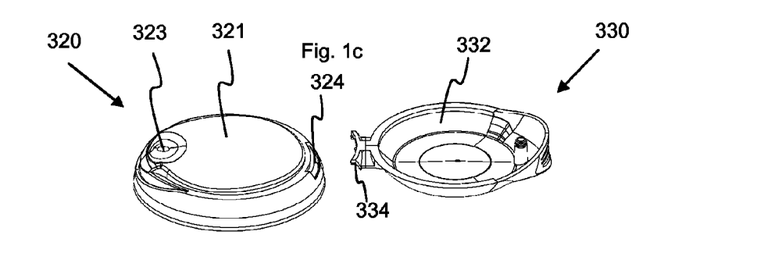
Figure 1D:
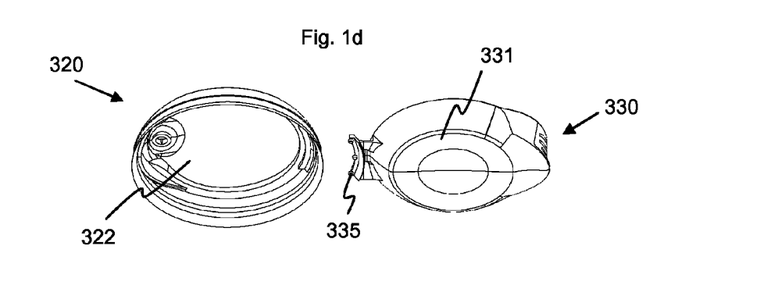
Figures 2, 3:
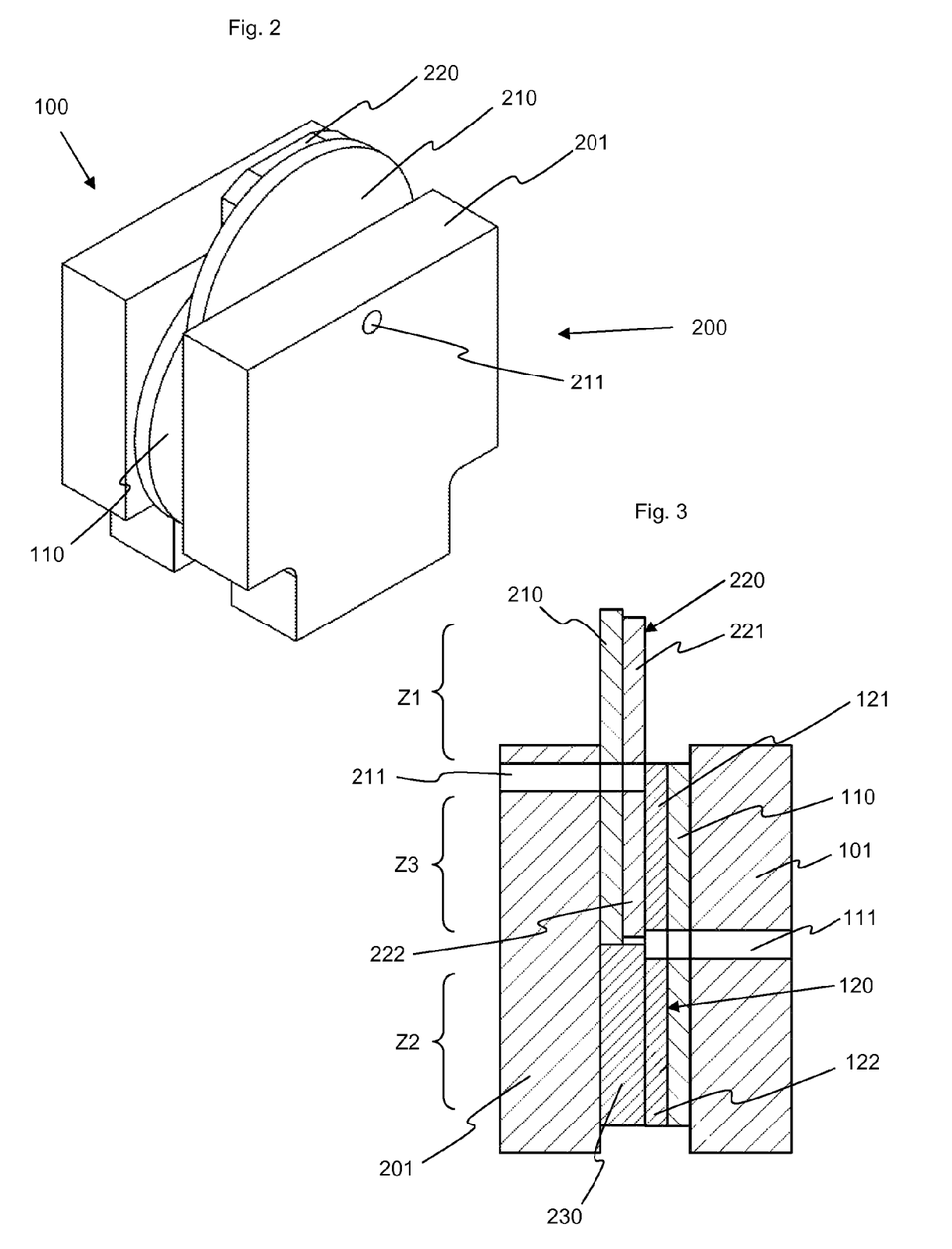
FIG. 2: a perspective view of the closed press.
FIG. 3: a transverse cross-sectional view of the closed press.
Figure 4:
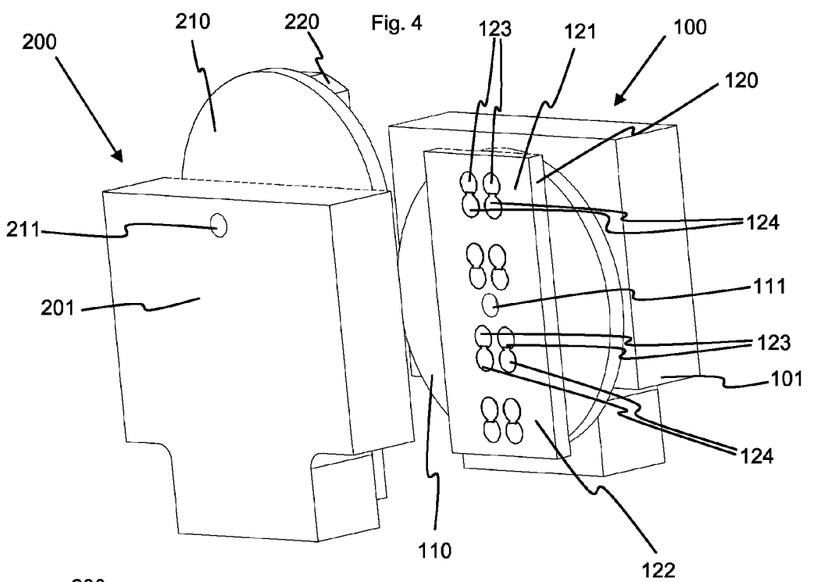
FIG. 4: a perspective view of the open press seen from the left.

The fixed portion (100) is provided with two injection lines. The first line injects a first material in the area of the cores (124) for the caps, which are located in the mold portion (120) located below. In the example of FIG. 4, the injection of the first material thus takes place in the area of the cores (124) of the second portion (122). The second injection line injects a second material in the area of the matrices (123) of the dispensing head located in the mold portion which is located above. In the example of FIG. 4, the injection of the second material takes place in the area of the matrices (123) located in the portion (121).

The movable part (200) is constituted by a movable frame (201) on which is mounted a second rotary plate (210) pivotable about a second axis of rotation (211) perpendicular to the plate. A second mold (220) is fixed to the second plate (210). This second mold (220) is divided into two portions (221, 222) symmetrical with respect to the second axis of rotation (211). Each portion (221, 222) has four cavities arranged in a square. To each cavity is associated the matrix (224) of the outer face (331) of the hinged cap. These matrices (224) are placed on the second mold. Within each cavity is a core (223) having a diameter corresponding to the inner diameter of the skirt (310) and whose top face has a shape complementary to that of the inner face (322) of the dispensing head (320). The core acts as a support for the skirt. The matrices (224) are arranged such that they are at the center of the square while the cavities having the cores (223) are on the edges of the square. Rotation means are provided for rotating the second rotary plate between two opposite positions: in the first, the first portion (221) of the second mold is located at the top, above the second axis of rotation (211) and the second (222) is located at the bottom, below the second axis of rotation. This is the situation shown in FIG. 5. In the second position, the two portions (221, 222) are rotated 180° and are thus reversed.

Figure 5:
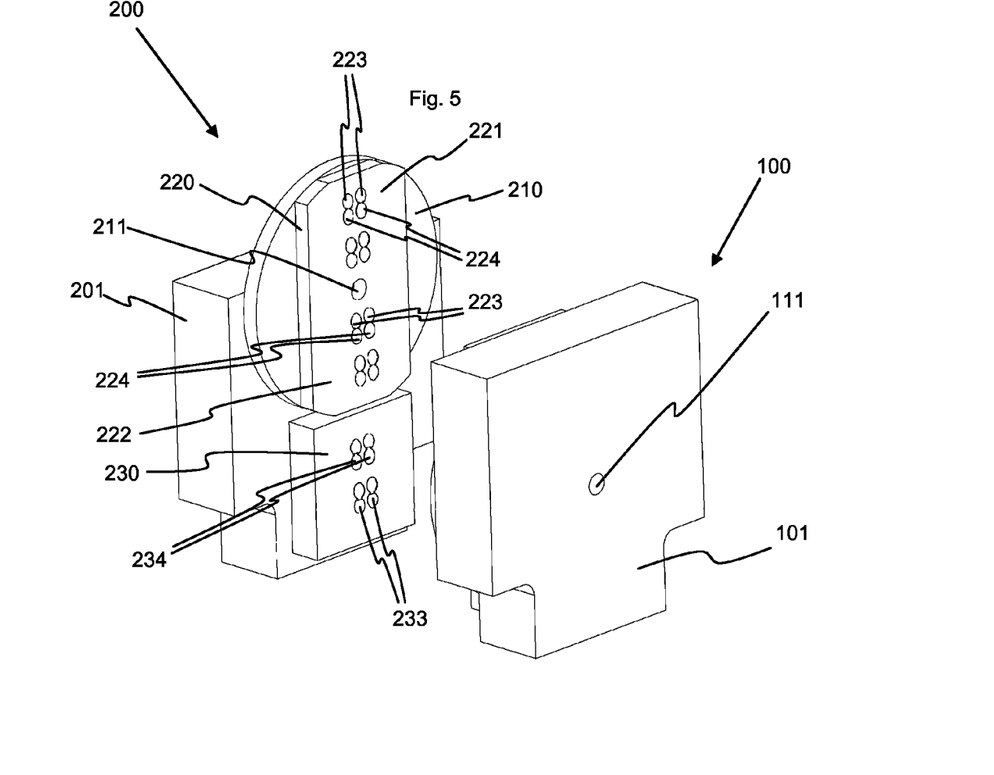
FIG. 5: a perspective view of the open press seen from the right.

The two plates (110, 210) are parallel, and the two axes (111, 211) are also parallel. However, the two axes are offset in the vertical plane so that the upper portion of the first plate (110) is aligned with the lower portion of the second disc (210). In the closed position of the press, this upper portion of the first mold is in contact with the lower portion of the second mold in the common zone (Z3), while the lower portion of the first mold is not in contact with the second mold and the upper portion of the second mold is not in contact with the first mold. In the examples shown in the figures, the portion (121) shown at the top in FIG. 4 is in contact with the portion (222) shown at the bottom in FIG. 5 in the common zone (Z3). In contrast, the second portion (122) of the first mold shown at the bottom in FIG. 4 is not in contact with the second mold (220) and is located in the introduction zone (Z2) and the first portion (221) of the second mold (220) shown at the top in FIG. 5 is not in contact with the first mold (120) and is located in the insertion zone (Z1). When one or the other of the plates rotates by 180°, the corresponding portions of the molds are reversed.

Below the second rotary plate (210) is a third mold (230) used to form the outer face (331) of the caps (330). This third mold (230) is fixed relative to the movable frame (201). It has four molding surfaces arranged in a square. Each molding surface is constituted by, on the one hand, a matrix (234) having a shape complementary to that of the outer face (331) of the cap (330), and on the other hand, a core (233) having a shape complementary to the outer surface (321) of the dispensing head, and whose function will be explained below. The molding surfaces are oriented so that the matrices (234) for the cap are in the center of the square while the cores (233) having shapes complementary to those of the heads are arranged on the edges of the square.

Means are provided for moving the movable portion (200) between a position in which it is pressed against the fixed part (100) and a position in which it is spaced apart from it.

In the closed position, the portion of the second mold (220) located below is in contact with the portion of the first mold part (120) located above. The cavities having the cores (223) located in the lower portion of the second mold (220) are aligned with the matrices (123) of the dispensing heads located in the upper portion of the first mold (120). Similarly, the matrices (224) for the caps located in the lower portion of the second mold (220) are aligned with the cores (124) located in the upper portion of the first mold (120). Because of the symmetry of the first and second molds (120, 220) relative to the axes of rotation (111, 211), these alignments cavities having the cores (223)/matrix (123) and matrix (224)/cores (124) are maintained as long as one or another of the portions (221, 222) of the second mold is in the lower position facing one or another of the portions (121, 122) of the first mold located in the upper position, that is to say, in the common zone (Z3).

When the press is closed, the upper portion of the second mold (220) is located outside the press, in the insertion zone (Z1), and is thus accessible.

When the press is closed, the lower portion of the first mold (120) is in contact with the third mold (230) of the movable portion. The matrices (234) for the caps of the third mold (230) are aligned with the cores (124) located in the lower portion of the first mold (120). Likewise, the cores (233) for the heads of the second mold (230) are aligned with the matrices (123) located in the lower portion of the first mold (120). Because of the symmetry of the first mold relative to the first axis of symmetry (211), these alignments are maintained as long as one or another portion (121, 122) of the first mold is in the lower position, facing the third mold (230), that is to say, in the cap injection zone (Z2). The process of the invention is now described in more detail. Chronologically, the process includes the following manufacturing steps:

a. The press is closed by bringing the movable portion (200) against the fixed portion (100);

b. Four skirts are inserted into the cavities having the cores (223) of the first portion (221) of the second mold (220) located above the second axis of rotation (211), that is to say, in the insertion zone (Z1). In parallel, the hinged caps (330) are injected into the cap injection zone (Z2), in the spaces between the matrices (234) of the third mold (230) and the cores (124) located in the second portion (122) of the first mold (120), which is located at the bottom in the cap injection zone;

c. After stabilization, the press is opened while ensuring that the caps are located around the cores (124) located in the lower portion of the first mold (120). These cores thus perform the function of supports for the cap;

d. The two plates (210, 110) are each rotated by 180°. The first portion (221) of the second mold which was previously above in the insertion zone (Z1) is now below in the common zone (Z3), while the second portion (122) of the first mold which was previously below in the introduction zone (Z2), and which is now equipped with the freshly molded caps, is located above in the common zone (Z3);

e. The press is closed;

f. Four skirts are put in place in the cavities having the cores (223) of the second portion (222) of the second mold. In parallel, new hinged caps are injected into the cap injection zone (Z2), in the spaces between the matrices (234) of the third mold (230) and the cores (124) of the first portion (121) of first mold. The dispensing heads (320) are overmolded on the caps and skirts in the common zone (Z3), in the spaces between the matrices (123) located in the second portion (122) of the first mold and the cores placed in the cavities having the cores (223) located in the first portion (221) of the second mold;

g. After stabilization, the press is opened while ensuring that the new hinged caps are arranged around the cores (124) located in the cap injection zone (Z2), and that the tubes obtained after overmolding of the dispenser heads are in the cavities having the cores (223) of the second mold (220);

h. The two plates (110, 210) are again rotated by 180°. The first portion (121) of the first mold has returned to the upper position in the common zone (Z3) and the second portion (222) of the second mold is once again in the lower position, also in the common zone (Z3);

i. The press is closed again;

j The four tubes which are arranged in the first portion (221) of the second mold are located in the insertion zone (Z1). They are ejected and four new skirts are inserted. In parallel, new hinged caps are injected into the cap injection zone (Z2) and the dispensing heads (320) are overmolded on the caps and skirts in the common zone (Z3). The cycle continues as in step g).

For injection of the hinged caps in steps b), f) and j) in the cap injection zone (Z2), the first material must be prevented from flowing into the matrix (123) of the dispensing head. To this effect, the cores located in the cavities (233) can have shapes inverse of those of the molding surfaces (123) of the first mold (that is to say, a shape complementary to that of the outer face of the dispensing head) so as to occupy the corresponding space in the matrix (123) of the first mold. Thus, these cores are not identical to the cores (223) in the molding surfaces of the second mold. The former have a shape complementary to that of the outer face (321) of the dispensing head, while the latter are shorter and have a shape complementary to the inner face (322) of the dispensing head.

Rather than injecting the hinged cap (330), it would also be possible to provide a device for introducing into the first mold caps previously manufactured in another tool, similar to the insertion of the skirts (310) into the cavities of the second mold. This is why this cap injection zone is also known as introduction zone. Likewise, it would be possible to provide a third injection zone to inject skirts in a corresponding molding surface, instead of introducing them into the cavities having the cores (223). To this effect, the movable portion could be equipped with a fourth mold, parallel to the first and arranged above it, facing the portion of the second mold which is not in contact with the first mold.

The method described in detail above may be supplemented by other operations. Instead of being divided into two symmetrical portions (221, 222), the second mold could be divided into three or four portions distributed symmetrically about the axis of rotation (211). Each portion would be equipped with the same number of matrices and cores as the first portion and these additional matrices and cores would be distributed on these additional portions according to the same symmetry with respect to the axis of rotation of the plate as on the first portion. For example, the introduction of skirts and ejection of the tubes (as in this case) could be provided in a first portion initially located in the upper position, a device for introducing inserts around the cores (223) of the second mold could be provided in a second portion arranged at 90° with respect to the first, overmolding of the dispensing head around the insert so as to connect the skirt and the cap (in a way similar to the exemplary embodiment described above) could be provided in a third portion arranged at 180° with respect to the first, and welding of a lid on the orifice (323) of the dispensing head could be provided in a fourth portion arranged at 270° with respect to the first. In the next step, the first plate carrying the freshly injected hinged caps is rotated by 180° while the second plate is rotated only by 90°. The introduction of the insert can be performed, not on the core (223) of the second mold, but in the matrix (123) of the first plate, which could then have three portions instead of two.

The method and the press of the invention can be used for the manufacture of tubes made in materials compatible with each other, that is to say which fuse together during overmolding. However, they can equally well be used for the manufacture of tubes in which incompatible materials are used. In the example shown in the figures, the material of the dispensing head (320) is compatible with that used for the skirt (310), but it is incompatible with that used for the cap (330). To this end, anchoring means are provided for the mechanical fastening of the cap on the dispensing head after overmolding. The first anchoring means are constituted by a tongue (334) provided with pins (335) formed on the hinged cap in the area of the fastening to the dispensing head. These first anchoring means are manufactured during the injection of the hinged cap. The second anchoring means are constituted by a groove (324) and cylindrical orifices which are formed in the dispensing head during overmolding. Because of the imprisonment of the pins (335) in the mass of the dispensing head, the cap is firmly attached to the dispensing head. It can be separated from the dispensing head only by tearing off the pins from the cap.

This method can be generalized to the manufacture of any article requiring overmolding of a second member on the first, or even on a third. It can be preceded by the initial injection of the first element. It can be performed using compatible materials or incompatible materials while providing anchoring means.

With the method of the invention, it is possible, in a same step, to extract the objects manufactured in the previous step and to insert in their place a first part into a mold, to insert a second part into another mold, and to overmold an additional part on the first two parts inserted into the molds in the previous step. It is even possible, rather than inserting or introducing the first or second part, to manufacture them by injection in the same press.

In the embodiment shown here, the molds or mold portions have four molding surfaces arranged in a square, that is to say along two lines, according to a double mirror symmetry. In principle, the number of molding surfaces depends on the size of the object to be obtained in relation to the size of the press. It would of course be possible to provide a single molding surface, and likewise, it would be possible to provide more than four molding surfaces and to distribute them over several rows/columns or in a circle or any other arrangement. The important thing is that molding surfaces arranged according to geometries compatible with the object to be obtained can be found on each mold or mold portion.

In general, the press of the invention allows overmolding of a third part (320) on two parts (310, 330) which, during overmolding, do not overlap or are not placed one upon the other or one facing the other Therefore, the part to be overmolded protrudes laterally with respect to at least one of the first parts For example, in the present example, it can be seen that the second part (330) does not touch the first (310) and is even completely offset laterally relative to the latter Therefore, the second part (330) is located next to the first part (310) during overmolding Thus, there is provided, in the first rotary mold (120), a molding surface (124) having a shape complementary to the inner face of the second part (330) and a molding surface (123) having a shape complementary to the outer face of the part to be overmolded Likewise, there is provided, in the third mold (230), a molding surface (234) having a shape complementary to the outer face of the second part (330) and a molding surface (233) having a shape complementary to the outer face of the part to be overmolded On the second mold (220), there is also, adjacent to the supports (223) for the first part (310), cores (223) having a molding shape complementary to the inner face of the part to be overmolded and molding surfaces (224) having a shape complementary to the outer face of the second part (330).

Thus, this press allows manufacturing in a very small space a finished object constituted by three parts made in different steps without requiring intermediate transfers.

LIST OF REFERENCES

- 100 fixed portion
  - 101 fixed frame
  - 110 first rotary plate
    - 111 first axis of rotation
  - 120 first mold
    - 121 first portion of the first mold
    - 122 second portion of the second mold
    - 123 matrix having a shape complementary to the outer face of the dispensing head
    - 124 core having a shape complementary to the inner face of the hinged cap
- 200 movable portion
  - 201 movable frame
  - 210 second rotary plate
    - 211 second axis of rotation
  - 220 second mold
    - 221 first portion of the second mold
    - 222 second portion of the second mold
    - 223 cores
    - 224 matrix having a shape complementary to the outer face of the hinged cap
  - 230 third mold
    - 233 core having a shape complementary to the outer face of the dispensing head
    - 234 matrix having a shape complementary to the outer face of the cap
- 300 tube
  - 310 skirt
  - 320 dispensing head
    - 321 outer face of the dispensing head
    - 322 inner face of the hinged cap
    - 323 orifice
    - 324 anchoring groove
  - 330 hinged cap
    - 331 outer face of the hinged cap
    - 332 inner face of the dispensing head
    - 334 anchoring tongue
    - 335 anchoring pins
- Z1 insertion zone
- Z2 introduction zone or cap injection zone
- Z3 common zone

The invention claimed is:

1. Press for overmolding a part on a first part and a second part so as to obtain an object in one piece, wherein the press comprises:
   a first frame having a first rotary plate pivotable about a first axis of rotation and on which is fixed a first mold having at least two portions, on each of which is located a molding surface having a shape complementary to that of a first face of the part to be overmolded, and a support for the second part, the molding surface and the support of the first portion being arranged according to a same symmetry with respect to the first axis of rotation as the molding surface and the support of the second portion;
   a second frame having a second rotary plate pivotable about a second axis of rotation and on which is fixed a second mold having at least two portions, on each of which is located a support for receiving the first part, the support of the first portion being arranged according to a same symmetry with respect to the second axis of rotation as the support of the second portion;
   the two frames being movable away from each other and toward each other in a translational movement parallel to the first axis of rotation of the first plate;
   the first plate and the second plate being parallel to each other;
   the first axis of rotation and the second axis of rotation being parallel to each other and offset so that, in the closed position of the press, one of the two portions of the first mold is aligned and in contact with one of the portions of the second mold in a zone called common zone, while the other portion of the first mold is not in contact with the second mold and is in an introduction zone and the other portion of the second mold is not in contact with the first mold and is in an insertion zone;
   the first portion and the second portion of the first mold being rotatable to bring the first portion and the second portion of the first mold into the common area or into the introduction zone and the first portion and the second portion of the second mold being rotatable to bring the first portion and the second portion of the second mold into the common zone or into the insertion zone;
   the molding surfaces and the supports of the first mold and the supports of the second mold being placed in their respective molds so as to create, when their mold portions are in contact in the common zone and a first part and a second part are in place on their respective supports, a space having a shape complementary to that of the part to be overmolded;
   the common zone being configured for injecting the material for the part to be overmolded,
   wherein each support of the second mold is associated with a molding surface located on said second mold, having a shape complementary to that of one of the faces of the second part, the molding surfaces of the second mold and the supports of the first mold being arranged on their respective molds so that they are aligned when their mold portions are in contact with each other in the common zone.

2. Press according to claim 1, wherein the second frame includes a device for introducing the second part facing the portion of the first mold which is in the introduction zone.

3. Press according to claim 2, wherein the device for introducing the second part into the first mold is constituted by a third mold, parallel to the second mold, said third mold including a molding surface having a shape complementary to that of one of the faces of the second part, and the supports of the first mold are constituted by molding surfaces for another face of the second part, the third mold being provided in the introduction zone for injecting the material for the second part into the space formed, when the press is closed, by the molding surface of the third mold and the molding surface of the first mold situated in the portion of the first mold located in the introduction zone.

4. Press according to claim 3, wherein the third mold comprises, in addition to the molding surface for the second part, a molding surface inverse to that of the molding surfaces of the first mold.

5. Press according to claim 3, which is designed for the manufacture of a tube constituted by a skirt forming the first part, a hinged cap forming the second part and a dispensing head forming the part to be overmolded, wherein the supports of the second mold are constituted by a core, the top face of which corresponds to at least a portion of the inner face of the dispensing head to be overmolded, the transverse cross section of the core corresponding to the internal transverse cross section of the skirt, the molding surfaces of the first mold corresponding to the outer face of the dispensing head to be overmolded and the supports to the inner face of the hinged cap, the molding surfaces of the third mold corresponding to the outer face of the hinged cap.

6. Press according to claim 1, wherein each portion of the first mold and of the second mold and the third mold include multiple sets of supports and/or molding surfaces so that several parts can be molded simultaneously.

7. Press according to claim 1, wherein at least one of the first and second molds, in addition to the first portions and second portions, other additional portions, each having the same number of additional molding surfaces or molding surfaces and supports as the corresponding first and second portions, the additional molding surfaces and/or supports being arranged on the additional portions according to the same symmetry with respect to the axis of rotation of the corresponding plate as the molding surfaces and/or supports of the corresponding first and second portions.

8. Method of overmolding a part on a first part and on a second part so as to obtain an object in one piece, the method providing the following steps performed using the press according to claim 1:
   a. inserting first parts into the supports of the portion of the second mold located in the insertion zone and introducing second parts into the supports of the portion of the first mold located in the introduction zone;
   b. opening the press if the latter is not already open, and rotating the two plates so that the portion of the first mold which was in the introduction zone and the portion of the second mold which was in the insertion zone are located in the common zone;
   c. closing the press;
   d. inserting first parts into the supports of the portion of the second mold located in the insertion zone and introducing second parts into the supports of the portion of the first mold located in the introduction zone, and overmolding the overmolded parts on the first part and the second part located in the common zone;
   e. opening the press in such a way that the objects obtained after overmolding the overmolded part on the two other parts are located on the supports of the portion of the second mold located in the common zone;
   f. rotating the two plates so that the portion of the first mold which was in the introduction zone and the portion of the second mold which was in the insertion zone are located in the common area;
   g. closing the press;
   h. extracting the finished objects located on the supports of the portion of the second mold part located in the insertion zone and inserting new first parts onto the supports thus freed, introducing new second parts onto the supports of the portion of the first mold located in the introduction zone, and overmolding the overmolded parts on the first parts and second parts located in the common zone;
   i. continuing the cycle as in step e).

9. Overmolding method according to claim 8, wherein step a is preceded by closing the press, and
in steps a, d and h, the introduction of second parts into the supports of the portion of the first mold located in the introduction zone is performed by injecting into the spaces formed between the molding surfaces of the third mold and the molding surfaces of the portion of the first mold located in the introduction zone, and
in steps b and e, opening of the press is performed so that the second parts obtained after injection into the introduction zone are located on the molding surfaces of the portion of the first mold located in the introduction zone.

10. Overmolding process according to claim 8, wherein the second mold includes molding surfaces, and a portion of the free face of the second parts is introduced into the molding surfaces of the second mold in steps c and g.

11. Overmolding process according to claim 8, wherein the second mold comprises a third portion, and the rotation of the second plate in steps b and f is performed so that the first portion of the second mold takes the place of the second, the second portion takes the place of the third and the third portion takes the place of the first, so that one of the portions is in the insertion zone, another is in the common zone and the third is in an intermediate zone which can be located chronologically between the insertion zone and the common zone or between the common zone and the insertion zone.

12. Method according to claim 11, wherein, in the intermediate zone, inserts are placed in the supports in order to drown them in the mass of the part to be overmolded or lids are welded on openings formed in the overmolded parts.

13. Overmolding process according to claim 8, wherein the second mold comprises a third portion and a fourth portion, and the rotation of the second plate in steps b and f is performed so that the first portion of the second mold takes the place of the second, the second portion takes the place of the third, the third portion takes the place of the fourth and the fourth portion takes the place of the first, so that one of the portions is in the insertion zone, another is in the common zone and the third and fourth are in two intermediate zones which can be located chronologically between the insertion zone and the common zone and/or between the common zone and the insertion zone.

14. Method according to claim 13, wherein, in the first intermediate zone, inserts are placed in the supports in order to drown them in the mass of the part to be overmolded, and in the second intermediate zone, lids are welded on the openings formed in the overmolded parts.

15. Press for overmolding a part on a first part and a second part so as to obtain an object in one piece, wherein the press comprises:
   a first frame having a first rotary plate pivotable about a first axis of rotation and on which is fixed a first mold having at least two portions, on each of which is located a molding surface having a shape complementary to that of a first face of the part to be overmolded, and a support for the second part, the molding surface and the support of the first portion being arranged according to a same symmetry with respect to the first axis of rotation as the molding surface and the support of the second portion;
   a second frame having a second rotary plate pivotable about a second axis of rotation and on which is fixed a second mold having at least two portions, on each of which is located a support for receiving the first part, the support of the first portion being arranged according to a same symmetry with respect to the second axis of rotation as the support of the second portion;
   the two frames being movable away from each other and toward each other in a translational movement parallel to the first axis of rotation of the first plate;
   the first plate and the second plate being parallel to each other;

the first axis of rotation and the second axis of rotation being parallel to each other and offset so that, in the closed position of the press, one of the two portions of the first mold is aligned and in contact with one of the portions of the second mold in a zone called common zone, while the other portion of the first mold is not in contact with the second mold and is in an introduction zone and the other portion of the second mold is not in contact with the first mold and is in an insertion zone;

the first portion and the second portion of the first mold being rotatable to bring the first portion and the second portion of the first mold into the common area or into the introduction zone and the first portion and the second portion of the second mold being rotatable to bring the first portion and the second portion of the second mold into the common zone or into the insertion zone;

the molding surfaces and the supports of the first mold and the supports of the second mold being placed in their respective molds so as to create, when their mold portions are in contact in the common zone and a first part and a second part are in place on their respective supports, a space having a shape complementary to that of the part to be overmolded;

the common zone being configured for injecting the material for the part to be overmolded, wherein the second frame includes a device for introducing the second part facing the portion of the first mold which is in the introduction zone, wherein the device for introducing the second part into the first mold is constituted by a third mold, parallel to the second mold, said third mold including a molding surface having a shape complementary to that of one of the faces of the second part, and the supports of the first mold are constituted by molding surfaces for another face of the second part, the third mold being provided in the introduction zone for injecting the material for the second part into the space formed, when the press is closed, by the molding surface of the third mold and the molding surface of the first mold situated in the portion of the first mold located in the introduction zone, wherein the third mold comprises, in addition to the molding surface for the second part, a molding surface inverse to that of the molding surfaces of the first mold, wherein the press is designed for the manufacture of a tube constituted by a skirt forming the first part, a hinged cap forming the second part and a dispensing head forming the part to be overmolded, wherein the supports of the second mold are constituted by a core, the top face of which corresponds to at least a portion of the inner face of the dispensing head to be overmolded, the transverse cross section of the core corresponding to the internal transverse cross section of the skirt, the molding surfaces of the first mold corresponding to the outer face of the dispensing head to be overmolded and the supports to the inner face of the hinged cap, the molding surfaces of the third mold corresponding to the outer face of the hinged cap.

16. Press according to claim 4, which is designed for the manufacture of a tube constituted by a skirt forming the first part, a hinged cap forming the second part and a dispensing head forming the part to be overmolded, wherein the supports of the second mold are constituted by a core, the top face of which corresponds to at least a portion of the inner face of the dispensing head to be overmolded, the transverse cross section of the core corresponding to the internal transverse cross section of the skirt), the molding surfaces of the first mold corresponding to the outer face of the dispensing head to be overmolded and the supports to the inner face of the hinged cap, the molding surfaces of the third mold corresponding to the outer face of the hinged cap.

17. Press according to claim 1, wherein injection means are provided for injecting the material for the part to be overmolded into the common zone.

18. Press according to claim 15, wherein injection means are provided for injecting the material for the part to be overmolded into the common zone.

* * * * *